(12) United States Patent
Decker (10) Patent No.: US 10,670,489 B2
(45) Date of Patent: Jun. 2, 2020

(54) DEVICE AND METHOD FOR CALIBRATING A FILM CHAMBER FOR LEAK DETECTION

(71) Applicant: INFICON GmbH, Cologne (DE)

(72) Inventor: Silvio Decker, Cologne (DE)

(73) Assignee: INFICON GmbH, Cologne (DE)

( * ) Notice: Subject to any disclaimer, the term of this patent is extended or adjusted under 35 U.S.C. 154(b) by 222 days.

(21) Appl. No.: 15/513,715

(22) PCT Filed: Sep. 22, 2015

(86) PCT No.: PCT/EP2015/071665
§ 371 (c)(1),
(2) Date: Mar. 23, 2017

(87) PCT Pub. No.: WO2016/046170
PCT Pub. Date: Mar. 31, 2016

(65) Prior Publication Data
US 2017/0292894 A1    Oct. 12, 2017

(30) Foreign Application Priority Data

Sep. 25, 2014    (DE) .......................... 10 2014 219 481

(51) Int. Cl.
*G01M 3/32* (2006.01)
*G01M 3/00* (2006.01)

(52) U.S. Cl.
CPC .......... *G01M 3/3218* (2013.01); *G01M 3/007* (2013.01); *G01M 3/3281* (2013.01); *G01M 3/329* (2013.01)

(58) Field of Classification Search
CPC .. G01M 3/3218; G01M 3/007; G01M 3/3281; G01M 3/329; G01M 3/00
See application file for complete search history.

(56) References Cited

U.S. PATENT DOCUMENTS

| 4,593,554 A | 6/1986 | Aarts |
| 5,170,660 A | 12/1992 | Lehmann |

(Continued)

FOREIGN PATENT DOCUMENTS

| CN | 101424581 A | 5/2009 |
| DE | 3925067 A1 | 2/1991 |

(Continued)

*Primary Examiner* — Eric S. McCall
*Assistant Examiner* — Timothy P Graves
(74) *Attorney, Agent, or Firm* — The Webb Law Firm (57) ABSTRACT

A method for calibrating a test chamber, which encloses an interior volume (20), is designed as a film chamber (12) comprising at least one flexible wall region (14, 16), and is connected in a gas-conducting way to a pressure sensor (30), to a vacuum pump (26), and via a calibration valve (34) to a calibration chamber (36) enclosing a calibration volume (37), comprising the following steps: evacuating the film chamber (12); measuring the pressure difference inside of the film chamber (12); after the evacuation has been completed, connecting the calibration volume (37) in a gas-conducting manner to the interior volume (20) of the film chamber (12) while measuring the pressure change, wherein the pressure in the calibration chamber (36) is greater than the pressure in the film chamber (12) before the connection to the film chamber (12). A corresponding device is likewise disclosed.

5 Claims, 5 Drawing Sheets

(56) References Cited

U.S. PATENT DOCUMENTS

| | | | | |
|---|---|---|---|---|
| 6,306,349 B1 * | 10/2001 | Moon | ................ | G01N 15/0893 |
| | | | | 422/69 |
| 8,201,438 B1 * | 6/2012 | Thornberg | .............. | G01M 3/34 |
| | | | | 73/49.2 |
| 2010/0282799 A1 | 11/2010 | Hubbard | | |
| 2014/0311222 A1 * | 10/2014 | Decker | ............... | G01M 3/3218 |
| | | | | 73/40 |

FOREIGN PATENT DOCUMENTS

| | | |
|---|---|---|
| DE | 102006027344 B4 | 2/2011 |
| DE | 102011086486 A1 | 5/2013 |
| EP | 2447694 A1 | 5/2012 |

\* cited by examiner

DEVICE AND METHOD FOR CALIBRATING A FILM CHAMBER FOR LEAK DETECTION

CROSS-REFERENCE TO RELATED APPLICATIONS

This application is the United States national phase of International Application No. PCT/EP2015/071665 filed Sep. 22, 2015, and claims priority to German Patent Application No. 10 2014 219 481.4 filed Sep. 25, 2014, the disclosures of which are hereby incorporated in their entirety by reference.

BACKGROUND OF THE INVENTION

Field of the Invention

The invention relates to a method and a device for calibrating a film chamber for leak detection.

Description of Related Art

A film chamber is a special form of a test chamber for receiving a test object to be tested for tightness. The film chamber is characterized by the fact that at least one wall portion is made of a flexible material (film). A test object to be tested for the presence of a leak is placed inside the film chamber and the film chamber is evacuated subsequently. During the evacuation of a film chamber, air is drawn from the film chamber whereby the flexible film chamber wall clings to the test object. A particularly suitable film chamber comprises two film layers which enclose the test object and are connected with each other in a gas-tight manner at their edge portions. During the evacuation of the film chamber the film is drawn to the test object except for remaining dead volumes. Using a pressure sensor, the pressure characteristic is subsequently measured inside the film chamber in the region outside the test object. If gas escapes from the test object through a leak in the test object, the correspondingly measured pressure increase serves as an indication of a leak. In this regard, the leakage rate can be measured based on the pressure increase. For this purpose, the film chamber volume, i.e. the inner volume enclosed by the film chamber, must be known. The film chamber volume existing after the evacuation depends on the size and the shape of the test object. Dead volumes are formed when the film does not cling perfectly to the test object.

The film chamber itself emits gas into the film chamber volume, e.g. by components gassed out from the film chamber wall. This results in a pressure increase (offset pressure increase) inside the film chamber. This offset pressure increase and the dead volumes of the film chamber influence the entire leakage rate. This results in an error in the determination of the leakage rate. Conventionally, in order to avoid this error, a prior measurement with a tight test object is performed so as to detect the offset pressure increase and the dead volumes. In this regard, the dead volumes can be determined only by a product-dependent calibration prior to the actual measurement, if at all. When the test object is changed, e.g. in a sampling test, or when the number of test objects changes, a prior product-dependent calibration is inexact.

SUMMARY OF THE INVENTION

It is an object of the invention to provide an improved method and an improved device for calibrating a film chamber.

According thereto the inner space of the film chamber, i.e. the film chamber volume enclosed by the film chamber, is connected in a gas-conducting manner with a calibration volume enclosed by a calibration chamber. A calibration valve is provided between the film chamber and the calibration chamber, by which valve the gas conveyance path between the film chamber and the calibration chamber is closed during the evacuation of the film chamber. After the film chamber has been evacuated and while the pressure change in the film is measured by the pressure sensor, the calibration valve is opened, wherein, upon opening the calibration valve, the pressure inside the calibration chamber is higher or lower than inside the evacuated film chamber.

After the calibration valve has been opened, gas flows from the calibration chamber into the film chamber (or vice versa), resulting in an abrupt pressure increase or drop inside the film chamber. This change in pressure may be referred to as an abrupt pressure stroke. Here, the pressure stroke is proportional to the film chamber volume. In case of an empty film chamber, i.e. without a test object, this is the entire inner volume of the film chamber. When a test object is contained in the film chamber, this is the remaining volume in the film chamber in the region outside the test object. Based on the pressure stroke it is possible in each measurement to exactly determine the respective current film chamber volume, and thus the leakage rate, from the pressure increase. A prior separate calibration measurement is no longer required in this case.

The calibration volume should be so large that, depending on the pressure sensor used, the pressure stroke can be measured well. The calibration volume should be at least $\frac{1}{1000}$ and preferably be in the range between $\frac{1}{200}$ and $\frac{1}{100}$ of the film chamber volume. The calibration volume may in particular be in the range between 0.5 cm$^3$ and 1 cm$^3$, with the film chamber volume being about 100 cm$^3$. Prior to opening the calibration valve, a pressure around atmospheric pressure (circa 1 bar) should prevail inside the calibration chamber. After the calibration valve has been opened, this results in a well-measurable pressure increase of circa 10 mbar inside the film chamber.

The film chamber volume may be determined from the difference between the pressure in the calibration volume before opening the calibration valve (know, preferably atmospheric pressure) and the pressure inside the film chamber after the calibration valve has been opened. This pressure difference is divided by the difference between the pressure in the film chamber after the calibration valve has been opened and the pressure in the film chamber before opening the calibration valve. The quotient from these two pressure differences is multiplied by the calibration volume to calculate the film chamber volume in the region outside the test object.

Preferably, the film chamber volume and the calibration volume are dimensioned such that the pressure in the film chamber after the calibration valve has been opened is much lower than the pressure in the calibration volume. Preferably, the pressure in the film chamber before opening the calibration valve should be lower than in the calibration volume by at least a factor of 10. The film chamber volume can then be calculated from the quotient from the pressure in the calibration volume before opening the calibration valve and the pressure stroke $\Delta p$ in the film chamber upon opening the calibration valve, multiplied by the calibration volume. The pressure stroke in the film chamber upon opening the calibration valve is the difference from the film chamber pressure the calibration valve has been opened and the film chamber pressure before opening the calibration valve.

The leakage rate of the test object can be determined from the pressure increase in the chamber, caused by a leak in a test object, only on the basis of a known inner volume of the film chamber. The film chamber volume of an empty chamber in the evacuated state is determined preferably by calibration using a calibrated test leak.

It is further possible to determine from the pressure stroke measured, whether the film chamber is empty or contains a test object. A smaller pressure stroke indicates the presence of a test object in the film chamber, whereas a greater pressure stroke indicates an empty film chamber without a test object, since the dead volumes are larger after the evacuation of a film chamber containing a test object than in case of an empty film chamber.

BRIEF DESCRIPTION OF THE DRAWINGS

Based on the pressure stroke and/or based on the film chamber volume (dead volume) determined, it is possible to also conclude on the shape, the size and/or the number of test objects in the film chamber.

The following is a detailed description of two embodiments of the invention with reference to the Figures. In the Figures.

DETAILED DESCRIPTION

The following description refers to the first embodiment shown in FIGS. 1-8.

Figure 1:
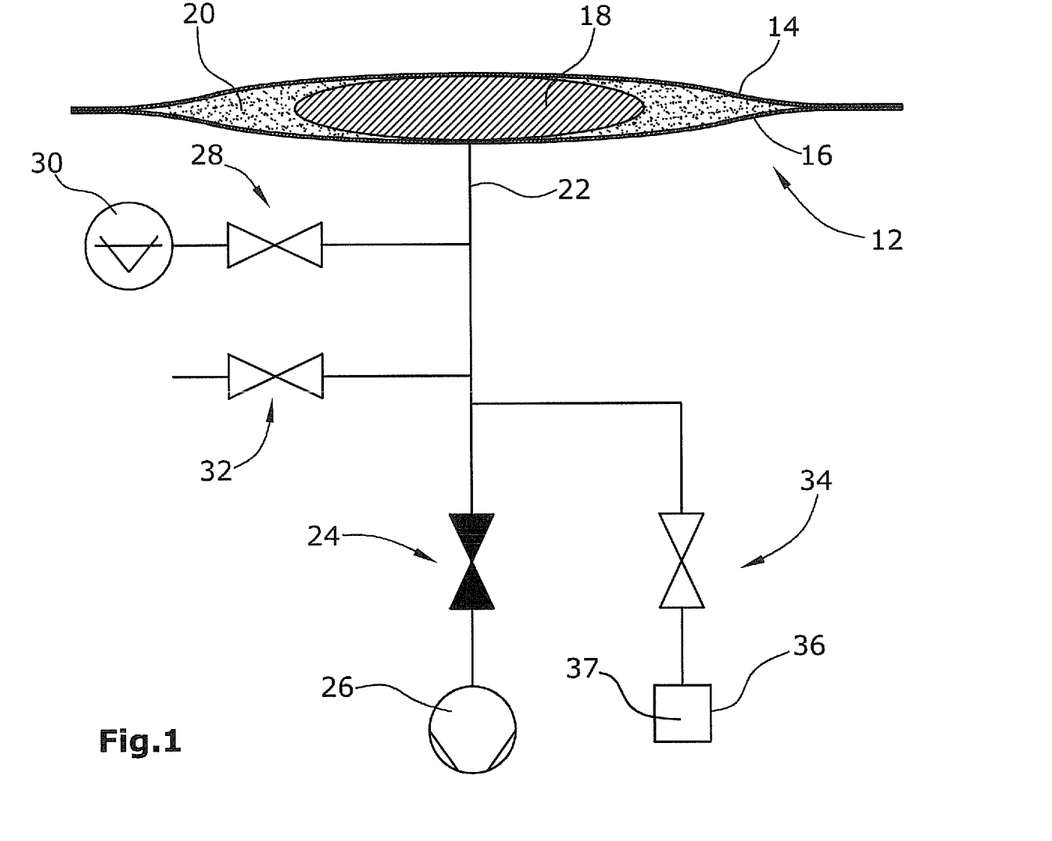
FIG. 1 is a schematic illustration of the first embodiment in a first operational state.

The film chamber 12 is formed by two film layers 14, 16 enclosing a test object 18 and connected with each other in a gas-tight manner at the edge portion of the test object. The film layers 14, 16 enclose a film chamber volume 20 in the interior of the film chamber 12. In FIG. 1, the film chamber volume 20 is the volume inside the film chamber 12 in the region outside the test object 18.

A gas line 22 connects the interior of the film chamber 12 in a gas-conducting manner with a vacuum pump 26 via an evacuation valve 24, with a pressure sensor 30 via a measuring valve 28, with the atmosphere surrounding the film chamber via a ventilation valve 32 and with a calibration chamber 36 via a calibration valve 34.

The calibration chamber 36 encloses a calibration volume which is initially filled with air at atmospheric pressure. The calibration valve 34 is initially closed. In the Figures the open state of a valve is represented by a valve illustrated as a filled symbol and the closed state of a valve is represented by a valve illustrated as an unfilled symbol. In the first operational state shown in FIG. 1, the measuring valve 28, the ventilation valve 32 and the calibration valve 34 are closed. On the other hand, the evacuation valve 24 is open. In the first operational state illustrated in FIG. 1, the test object 18 is in the gas-tightly closed film chamber, whereas the vacuum pump 26 evacuates the film chamber 12 via the gas line 22 while the evacuation valve 24 is open.

Figure 2:
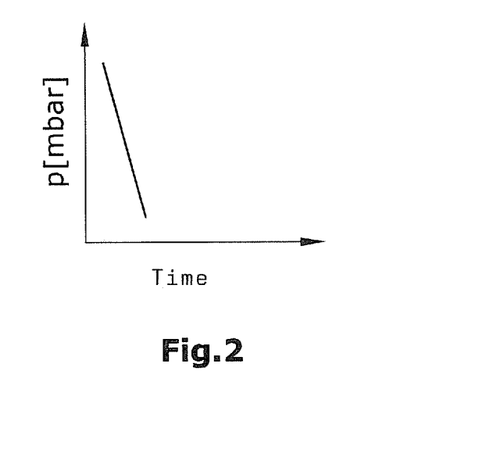
FIG. 2 shows the pressure characteristic in the first operational state.

FIG. 2 shows the pressure characteristic that occurs in the film chamber 12 during the evacuation. With the measuring valve 28 open, the pressure sensor 30 would measure the pressure characteristic in FIG. 2. In FIG. 1, however, the measuring valve 28 is closed during the evacuation of the film chamber 12 to avoid damage to the pressure sensor 30.

Figure 3:
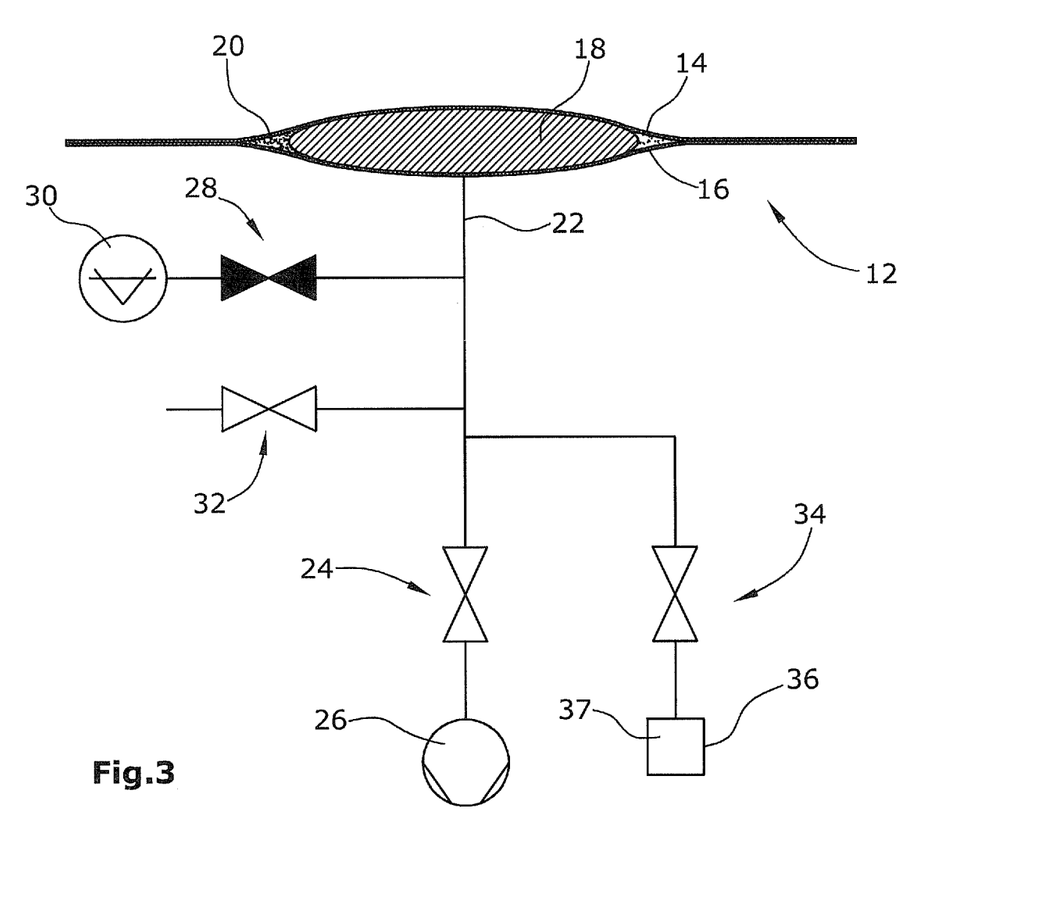
FIG. 3 shows the view of FIG. 1 in a second operational state.
Figure 4:
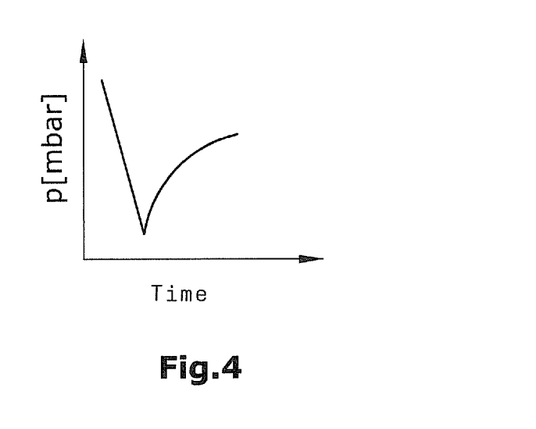
FIG. 4 shows the pressure characteristic in the second operational state.
Figure 5:
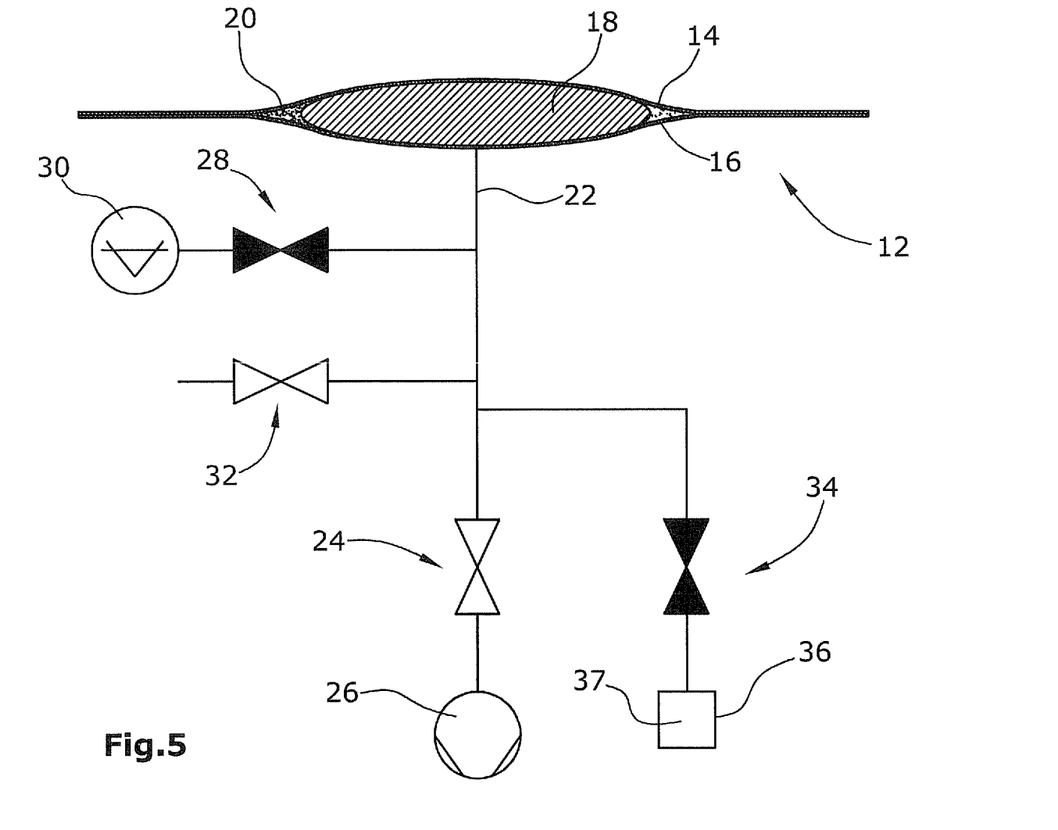
FIG. 5 shows the view of FIG. 1 in a third operational state.

FIG. 3 shows the subsequent operational state after the evacuation of the film chamber 12. The evacuation valve 24 is closed (illustrated as unfilled) and the measuring valve 28 is open (illustrated as filled). The hermetically closed film chamber volume 20 is thereby connected with the pressure sensor 30. As illustrated in FIG. 4, the pressure sensor 30 measures a pressure increase in the film chamber 12 over time. This pressure increase may result, on the one hand, from a leak in the test object 18 and, on the other hand, from an offset pressure. The increase in offset pressure is a pressure increase not caused by a leak in the test object 18 but by other physical effects such as e.g. gas molecules gassed out of the film chamber wall.

Figure 6:
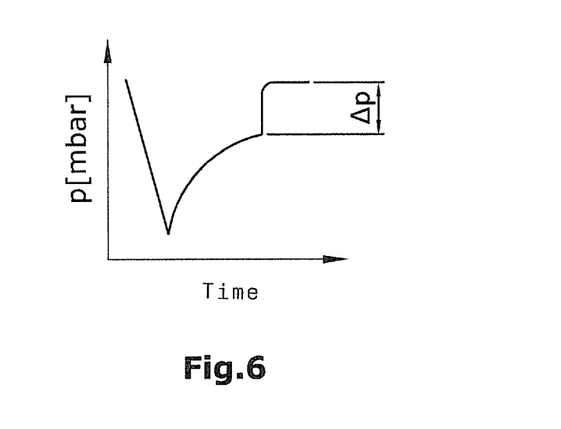
FIG. 6 shows the pressure characteristic in the third operational state.

After the evacuation of the film chamber 12 (first operational state) and the opening of the measuring valve 28 (second operational state), the calibration valve 34 is now opened as well. This third operational state is illustrated in FIG. 3. Air flows from the calibration chamber 36 through the open calibration valve 34 into the film chamber 12 via the gas line 22. Due to the great pressure difference between the vacuum in the film chamber 12 and the atmospheric pressure in the calibration chamber 36, the pressure in the film chamber 12 increases abruptly after the calibration valve 34 has been opened. This pressure stroke $\Delta p$ is illustrated in FIG. 6 and is measured by the pressure sensor 30. The pressure stroke $\Delta p$ is the difference between the pressure $p_G$ in the film chamber 12 after the calibration valve 34 has been opened and the pressure $p_F$ in the film chamber 12 before opening the calibration valve 34:

$$\Delta p = (p_G - p_F)$$

Since the total amount of gas in the film chamber 12 and in the calibration chamber 36 remains the same before and after opening the calibration valve, the following holds:

$$p_G(V_F + V_V) = p_F V_F + p_V V_V,$$

where $P_G$: the pressure in the film chamber 12 after the calibration valve 34 has been opened, $V_F$: the film chamber volume 20 to be determined, $V_V$: the calibration volume 37 in the calibration chamber 36 (in a range between 1/1000 and 1/100 of the film chamber volume without test object) and $P_V$: the pressure in the calibration chamber 36 before opening the calibration valve 34 (atmospheric pressure, circa 1 bar).

Based on the pressure stroke $\Delta p = p_G - p_F$, the film chamber volume 20 can be calculated from this as:

$$V_F = V_V \frac{(p_v - p_G)}{(p_G - p_F)} = V_V \frac{(p_v - p_G)}{\Delta p}$$

Preferably, even after the opening of the calibration valve 34, the pressure in the film chamber 12 is much lower than the in the calibration chamber 36 before the opening of the calibration valve 34 so that $p_C \ll p_V$. In this case, the following holds approximately for the film chamber volume to be determined 20:

$$V_F \approx V_V \frac{p_V}{p_G - p_F} = V_V \frac{p_V}{\Delta p}.$$

Based on the pressure stroke Δp, it is thus possible to determine the dead volume $V_F$ that occurs between the film layers 14, 16 and the test object 18 after the evacuation of the film chamber 12.

Figure 7:
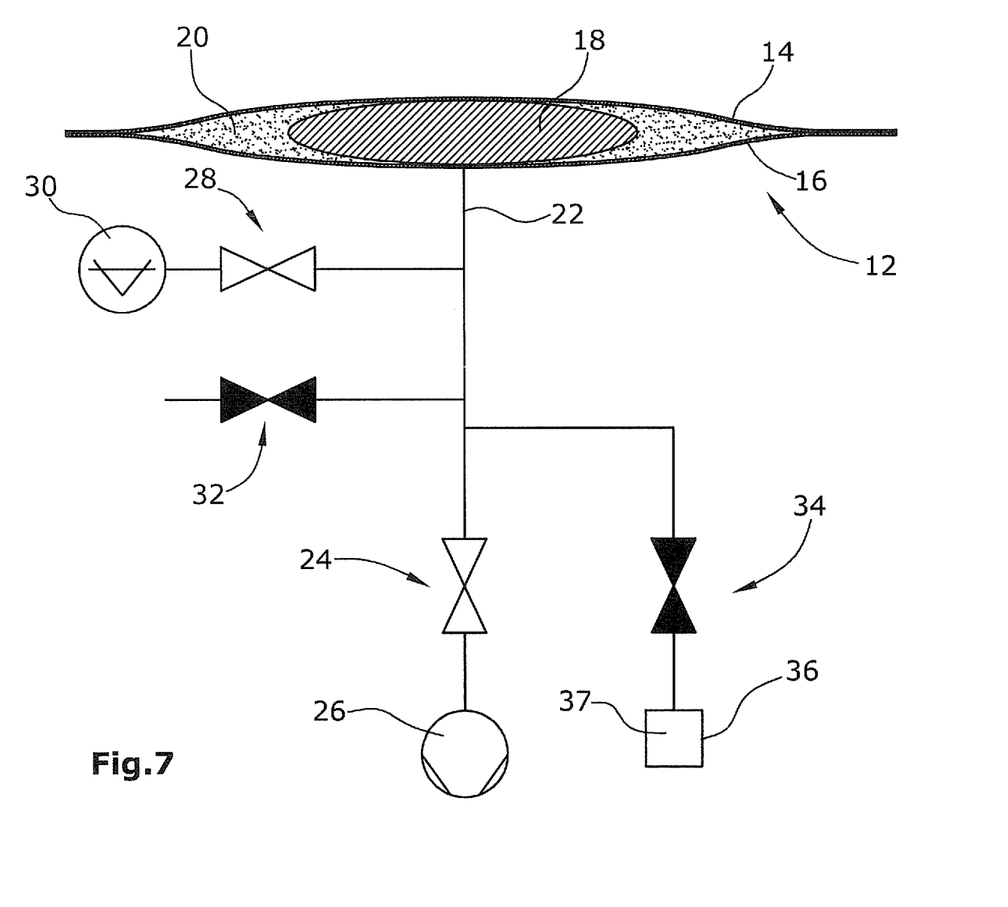
FIG. 7 shows the view of FIG. 1 in a fourth operational state.
Figure 8:
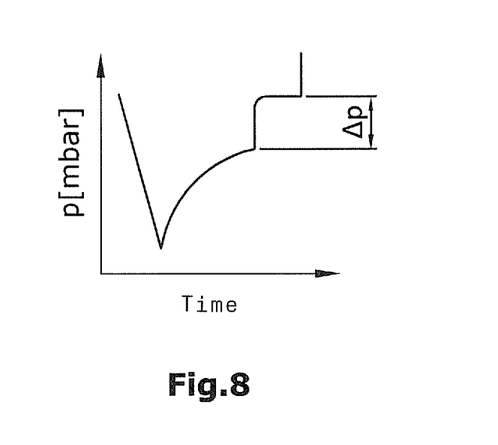
FIG. 8 shows the pressure characteristic in the fourth operational state.

After the measurement, the film chamber 12 and the calibration chamber 36 are ventilated by opening the ventilation valve 32 in addition to the open calibration valve 34. Here, the operational state illustrated in FIG. 7 is obtained.

Figure 9:
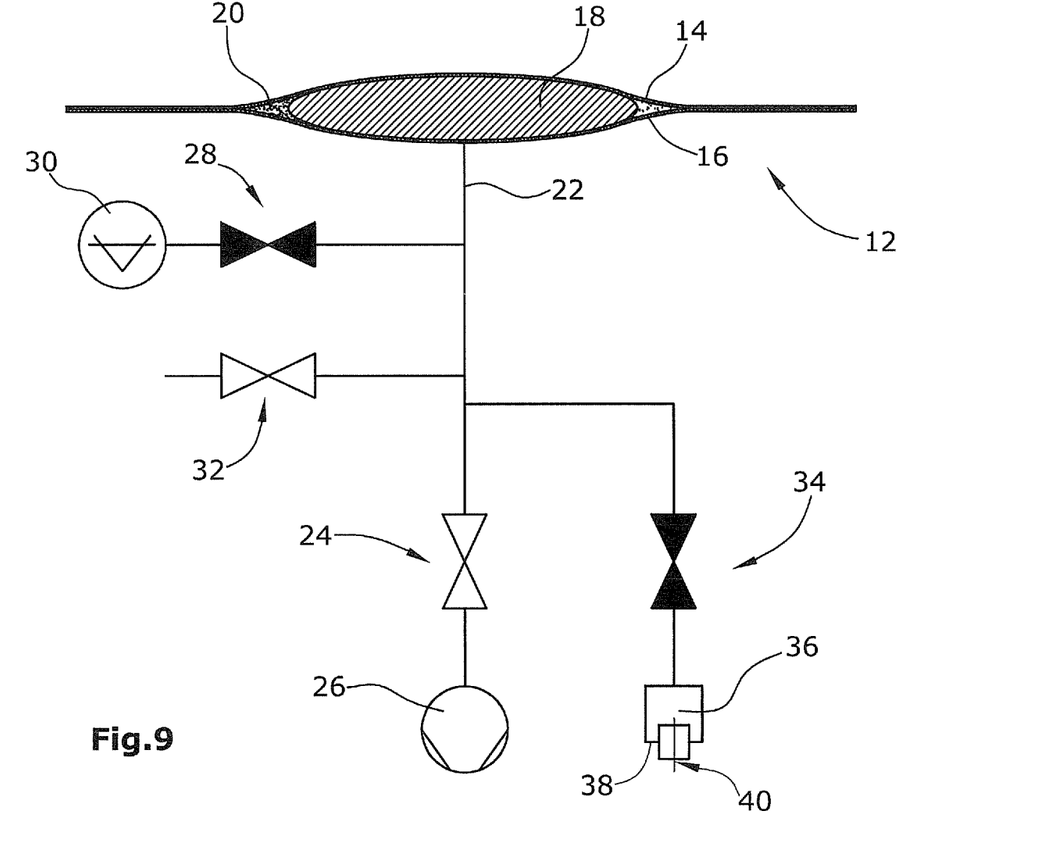
FIG. 9 is a schematic illustration of the second embodiment in an operational state.
Figure 10:
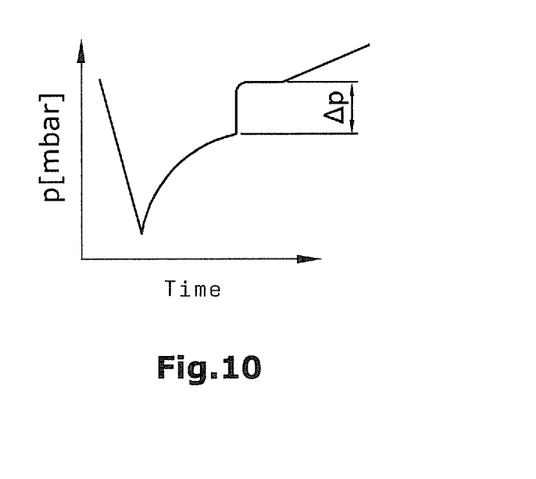
FIG. 10 shows the pressure characteristic in the operational state of FIG. 9.

The following description relates to the second embodiment illustrated in FIGS. 9 and 10.

The second embodiment differs from the first embodiment only in that the wall 38 of the calibration chamber 36 has a test leak 40 with a predefined leakage rate. The test leak 40 is a capillary test leak. After a pressure stroke Δp, the test leak 40 causes the further linear pressure increase illustrated on the far right in FIG. 10, which can be used to calibrate the entire system. Thus, in the second embodiment, after the film chamber volume 20 has been determined based on the pressure increase Δp, the linear pressure increase of the test leak 40 can be used to exactly calculate the leakage rate of the test object. Since the leakage rate of the test leak 40 is known, the gradient of the linear pressure increase caused by the test leak 40 makes it possible to exactly calculate the leakage rate of the test object from the pressure increase as illustrated in FIG. 4 or from the pressure stroke Δp.

The invention claimed is:

1. A method for calibrating a test chamber which encloses an inner volume, said test chamber being designed as a film chamber capable of forming a constant volume variable pressure container comprising at least one flexible wall portion and being connected in a gas-conducting manner to a pressure sensor, to a vacuum pump, and via a calibration valve to a calibration chamber enclosing a calibration volume, the method comprising the following steps in the following order:

evacuating the film chamber;

initiating measurement of the pressure characteristic over time, inside of the film chamber after the evacuation has been completed; and connecting the calibration volume in a gas-conducting manner to the inner volume of the film chamber while measurement of the pressure characteristic over time is continued, such that the pressure is measured from before the gas-conducting connection to the film chamber is made and is continued during the gas-conducting connection to the film chamber, wherein the pressure in the calibration chamber before the connection to the film chamber is higher or lower than the pressure in the film chamber, such that a pressure stroke results inside the film chamber upon opening the calibration valve, wherein the pressure stroke does not expand a film chamber volume, and calculating the film chamber volume based on said pressure stroke as $$V_F = V_V \frac{(p_v - p_G)}{(p_G - p_F)}$$

or $$V_F \approx V_V \frac{p_V}{p_G - p_F}$$

where
$V_F$: film chamber volume,
$V_V$: calibration volume,
$P_V$: pressure in the calibration chamber before connection with the film chamber volume,
$P_G$: pressure in the film chamber after connection with the calibration volume, and
$P_F$: pressure in the film chamber before connection with the calibration volume.

2. The method of claim 1, wherein the size of the calibration volume is in a range between 1/1000 and 1/100 of the film chamber volume and that approximately atmospheric pressure prevails in the calibration chamber before connection with the film chamber.

3. The method of claim 1, wherein the film chamber volume is determined with the test object contained in the film chamber.

4. The method of claim 1, further comprising determining whether the film chamber is empty or contains a test object from a measurement of the pressure.

5. A method for calibrating a test chamber which encloses an inner volume, said test chamber being designed as a film chamber capable of forming a constant volume variable pressure container comprising at least one flexible wall portion and being connected in a gas-conducting manner to a pressure sensor, to a vacuum pump, and via a calibration valve to a calibration chamber enclosing a calibration volume, the method comprising the following steps in the following order:

evacuating the film chamber;

initiating measurement of the pressure characteristic over time, inside of the film chamber after the evacuation has been completed; and connecting the calibration volume in a gas-conducting manner to the inner volume of the film chamber while measurement of the pressure characteristic over time is continued, such that the pressure is measured from before the gas-conducting connection to the film chamber is made and is continued during the gas-conducting connection to the film chamber, wherein the pressure in the calibration chamber before the connection to the film chamber is higher or lower than the pressure in the film chamber, such that a pressure stroke results inside the film chamber upon opening the calibration valve, wherein the pressure stroke does not expand a film chamber volume, and calculating the film chamber volume based on said pressure stroke as $$V_F = V_V \frac{(p_v - p_G)}{(p_G - p_F)}$$

or $$V_F \approx V_V \frac{p_V}{p_G - p_F}$$

where
$V_F$: film chamber volume,
$V_V$: calibration volume,
$P_V$: pressure in the calibration chamber before connection with the film chamber volume,
$P_G$: pressure in the film chamber after connection with the calibration volume, and
$P_F$: pressure in the film chamber before connection with the calibration volume,
wherein the calibration chamber is provided with a test leak having a predefined leakage rate, a calibration of the measuring sensor being performed after the calculation of the film chamber volume on the basis of a pressure increase in the film chamber caused by the test leak.

* * * * *